(12) United States Patent
Pan

(10) Patent No.: US 10,251,508 B2
(45) Date of Patent: Apr. 9, 2019

(54) KETTLE WITH FILTER CUP LIFTING ARRANGEMENT

(71) Applicant: Yun Pan, Huanggang (CN)

(72) Inventor: Yun Pan, Huanggang (CN)

( * ) Notice: Subject to any disclaimer, the term of this patent is extended or adjusted under 35 U.S.C. 154(b) by 153 days.

(21) Appl. No.: 15/594,432

(22) Filed: May 12, 2017

(65) Prior Publication Data

US 2018/0296025 A1 Oct. 18, 2018

(30) Foreign Application Priority Data

Apr. 12, 2017 (CN) .......................... 2017 1 0235880
Apr. 12, 2017 (CN) ..................... 2017 2 0381941 U

(51) Int. Cl.
*A47J 31/06* (2006.01)
*A47J 31/20* (2006.01)
*A47J 27/21* (2006.01)

(52) U.S. Cl.
CPC ......... *A47J 31/20* (2013.01); *A47J 27/21008* (2013.01); *A47J 27/21183* (2013.01); *A47J 31/0626* (2013.01); *A47J 31/0636* (2013.01)

(58) Field of Classification Search
CPC .... A47J 31/20; A47J 31/0636; A47J 31/0626; A47J 27/21008; A47J 27/21183
See application file for complete search history.

(56) References Cited

U.S. PATENT DOCUMENTS

| 2,566,914 | A | * | 9/1951 | Worst | A47J 31/20 99/282 |
| 7,279,660 | B2 | * | 10/2007 | Long | A47J 31/20 219/438 |
| 7,661,354 | B2 | * | 2/2010 | Shao | A47J 27/2105 99/280 |
| 9,492,027 | B2 | * | 11/2016 | Morse | A47J 31/20 |
| 2003/0080048 | A1 | * | 5/2003 | Lin | A47J 31/20 210/464 |
| 2015/0090127 | A1 | * | 4/2015 | Dong | A47J 31/0636 99/288 |
| 2016/0113434 | A1 | * | 4/2016 | Dong | A47J 31/20 99/319 |

* cited by examiner

*Primary Examiner* — Eric Keasel
(74) *Attorney, Agent, or Firm* — Tsz Lung Yeung

(57) ABSTRACT

A kettle includes a kettle body, a top cap, a heating base, a filter cup and a filter cup lifting arrangement. The kettle body includes a water reservoir having a receiving cavity. The filter cup is adapted for storing food or beverage items and communicating with the receiving cavity. The filter cup lifting arrangement includes a supporting member supported in the water reservoir, a stopper and a lifting member movably extended between the supporting member and the stopper through the top cap. The lifting member is arranged to drive the filter cup to move between an immersion position and a lifted-up position, wherein in the immersion position, the filter cup is moved to immerse under the hot water stored in the receiving cavity, wherein in the lifted-up position, the filter cup is moved to lift up from the hot water.

20 Claims, 10 Drawing Sheets

KETTLE WITH FILTER CUP LIFTING ARRANGEMENT

BACKGROUND OF THE PRESENT INVENTION

Field of Invention

The present invention relates to a kettle, and more particularly to a kettle comprising a filter cup lifting arrangement which is capable of selectively and controllably immersing a filter cup into hot water for making tea or other beverages.

Description of Related Arts

Tea is very popular throughout the world. A basic procedure in making tea is to immerse a predetermined amount of tea leaves into hot water for a predetermined period of time. Traditional Chinese tea-making skills require optimal mix of several relevant factors, including type of tea leaves, type of water, temperature and time of immersing the tea leaves into water, equipment in making the tea, and the environment in which the tea is made.

A conventional method of making tea is to pour a predetermined amount of boiled water into a tea pot. After that, a predetermined amount of tea leaves may be added to a filter cup which may then be immersed into the hot water stored in the tea pot. A major disadvantage of conventional tea pots is that they do not usually support water heating function. However, a conventional kettle or water heater may not be specifically designed to be equipped with the filter cup for making tea. Furthermore, conventional tea pots do not allow a user to conveniently adjust or control the concentration of the tea.

As a result, there is a need to develop a kettle which is capable of allowing a user to selectively make hot water or tea.

SUMMARY OF THE PRESENT INVENTION

Certain variations of the present invention provide a kettle comprising a filter cup lifting arrangement which is capable of selectively and controllably immersing into hot water for making tea.

Certain variations of the present invention provide a kettle comprising a filter cup lifting arrangement which is capable of allowing a user to selectively and conveniently make hot water or hot tea.

Certain variations of the present invention provide a kettle comprising a filter cup lifting arrangement which is capable of allowing a user to conveniently control the concentration of the tea made in the kettle.

Certain variations of the present invention provide a kettle comprising a filter cup lifting arrangement which allows a user to convenient detach a filter cup for refilling tea leaves or for cleaning.

In one aspect of the present invention, it provides a kettle, comprising:

a kettle body, which comprises a water reservoir having a receiving cavity and a top opening communicating the receiving cavity with an exterior of the water reservoir, and a heat plate provided on a bottom portion of the water reservoir;

a top cap detachably attached on the water reservoir for selectively covering the top opening;

a heating base thermally communicated with the heat plate for heating the heat plate at an elevated temperature;

a filter cup adapted for being selectively disposed in the receiving cavity, the filter cup having a side boundary wall and a bottom wall to form a storage cavity as a space surrounded by the side boundary wall and the bottom wall, at least one of the side boundary wall and the bottom wall having a plurality of meshes for communicating the storage cavity with the receiving cavity; and a filter cup lifting arrangement, which comprises:

a supporting member supported in the receiving cavity of the water reservoir, the filter cup being detachably attached on the supporting member;

a stopper operatively provided on top of the top cap; and a lifting member movably extended between the supporting member and the stopper through the top cap, in such a manner that the lifting member is arranged to drive the filter cup to move between an immersion position and a lifted-up position, wherein in the immersion position, the filter cup is moved to immerse under the hot water stored in the receiving cavity, wherein in the lifted-up position, the filter cup is moved to lift up from the hot water.

This summary presented above is provided merely to introduce certain concepts and not to identify any key or essential features of the claimed subject matter.

DETAILED DESCRIPTION OF THE PREFERRED EMBODIMENT

Figure 1:
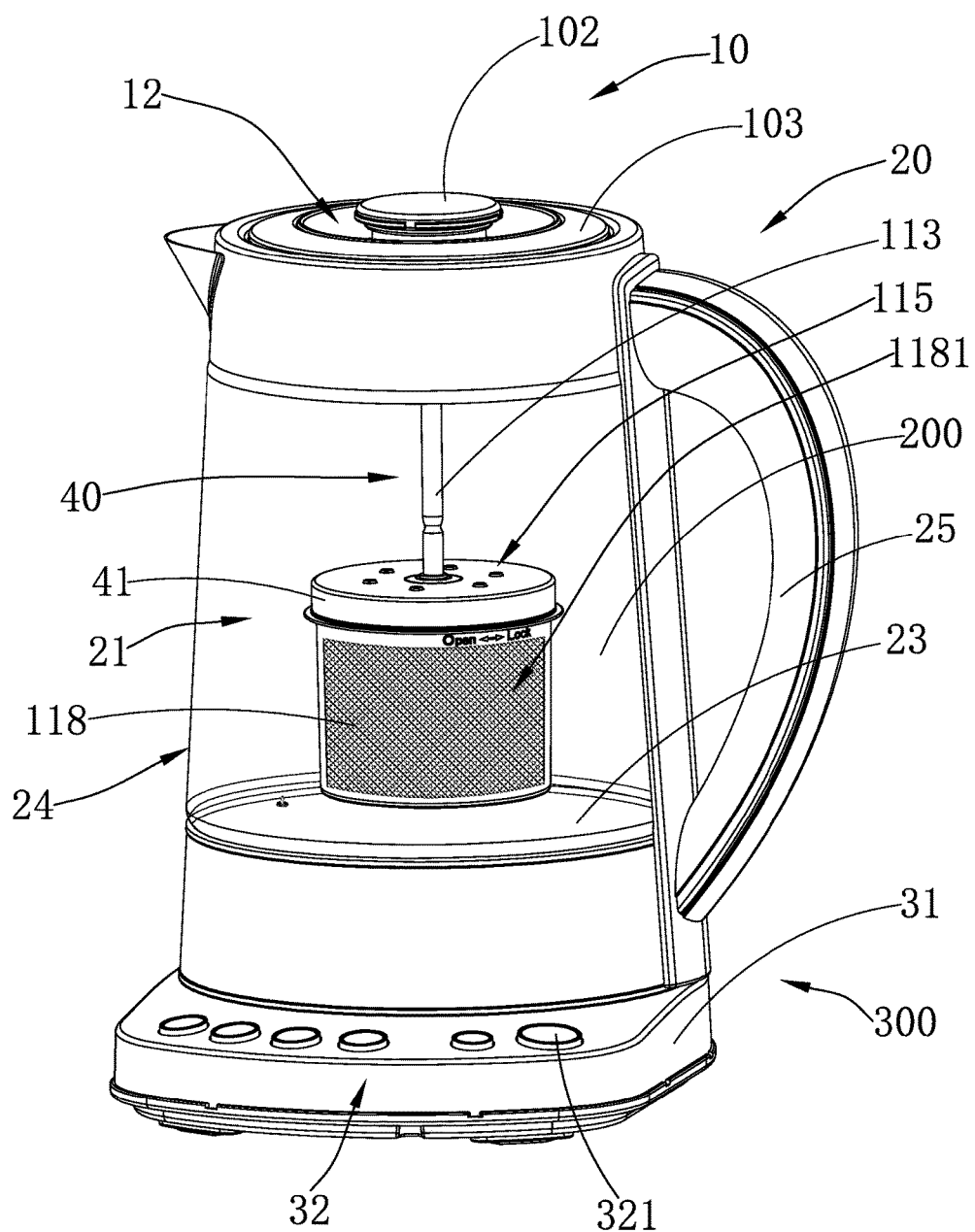
FIG. 1 is a perspective view a kettle according to a preferred embodiment of the present invention, illustrating that the filter cup is in an immersion position.

The following detailed description of the preferred embodiment is the preferred mode of carrying out the invention. The description is not to be taken in any limiting sense. It is presented for the purpose of illustrating the general principles of the present invention.

Referring to FIGS. 1 to 10 of the drawings, a kettle according a preferred embodiment of the present invention is illustrated. Broadly, the kettle may comprise a kettle body 20, a top cap 10, a heating base 300, a filter cup 118, and a filter cup lifting arrangement 40. The kettle is for selectively making hot water or making hot tea. However, other similar purposes or functions may also be served.

The kettle body 20 may comprise a water reservoir 200 having a receiving cavity 21 and a top opening 22 communicating the receiving cavity 21 with an exterior of the water reservoir 200, and a heat plate 23 provided on a bottom portion 24 of the water reservoir 200.

The top cap 10 may be detachably attached on the water reservoir 200 for selectively covering the top opening 22.

The heating base 300 may be thermally communicated with the heat plate 23 for heating the heat plate 23 at an elevated temperature.

The filter cup 118 may be adapted for being selectively disposed in the receiving cavity 21. The filter cup 118 may have at least one side boundary wall 1181 and a bottom wall 1182 to form a storage cavity 1183 as a space surrounded by the side boundary wall 1181 and the bottom wall 1182. At least one of the side boundary wall 1181 and the bottom wall 1182 may have a plurality of meshes 1184 for communicating the storage cavity 1183 with the receiving cavity 21.

The filter cup lifting arrangement 40 may comprise a supporting member 41, a stopper 102, and a lifting member 113. The supporting member 41 may be supported in the receiving cavity 21 of the water reservoir 200. The filter cup 118 may be detachably attached on the supporting member 41. The stopper 102 may be operatively provided on top of the top cap 10.

The lifting member 113 may movably extend between the supporting member 41 and the stopper 102 through the top cap 10, in such a manner that the lifting member 113 may be arranged to drive the filter cup 118 to move between an immersion position and a lifted-up position, wherein in the immersion position, the filter cup 118 is moved to immerse under the hot water stored in the receiving cavity 21, wherein in the lifted-up position, the filter cup 118 is moved to lift up from the hot water.

According to the preferred embodiment of the present invention, the kettle may be configured as having a number of variations. For example, the kettle may be configured as having a substantially circular cross sectional shape. Other cross sectional shape may also be possible. The kettle may be designed primarily for making hot tea or hot water. However, it may also be designed to make other kinds of drinks.

The kettle body 20 may further comprise a handle 25 attached on one side of the water reservoir 200 for allowing a user to conveniently grab the kettle body 20.

The water reservoir 200 may be configured from glass material (such as tempered glass) so that it may be transparent or at least visually accessible from outside. Furthermore, the kettle body 20 may further comprise a top rim member 26 provided on top of the water reservoir 200. The top rim member 26 may be made of metallic material for reinforcing the water reservoir 200 when it is heated by the heating plate 23. The top rim member 26 may also have a substantially annular cross sectional shape in which a diameter of the top rim member 26 may correspond to that of the top opening 22 of the water reservoir 200. Thus, the top rim member 26 may also have a through rim opening 261 which may overlap with the top opening 22 of the water reservoir 200. A user may be able to pour water into the receiving cavity 21 through the top opening 22 and the through rim opening 261.

Figure 2:
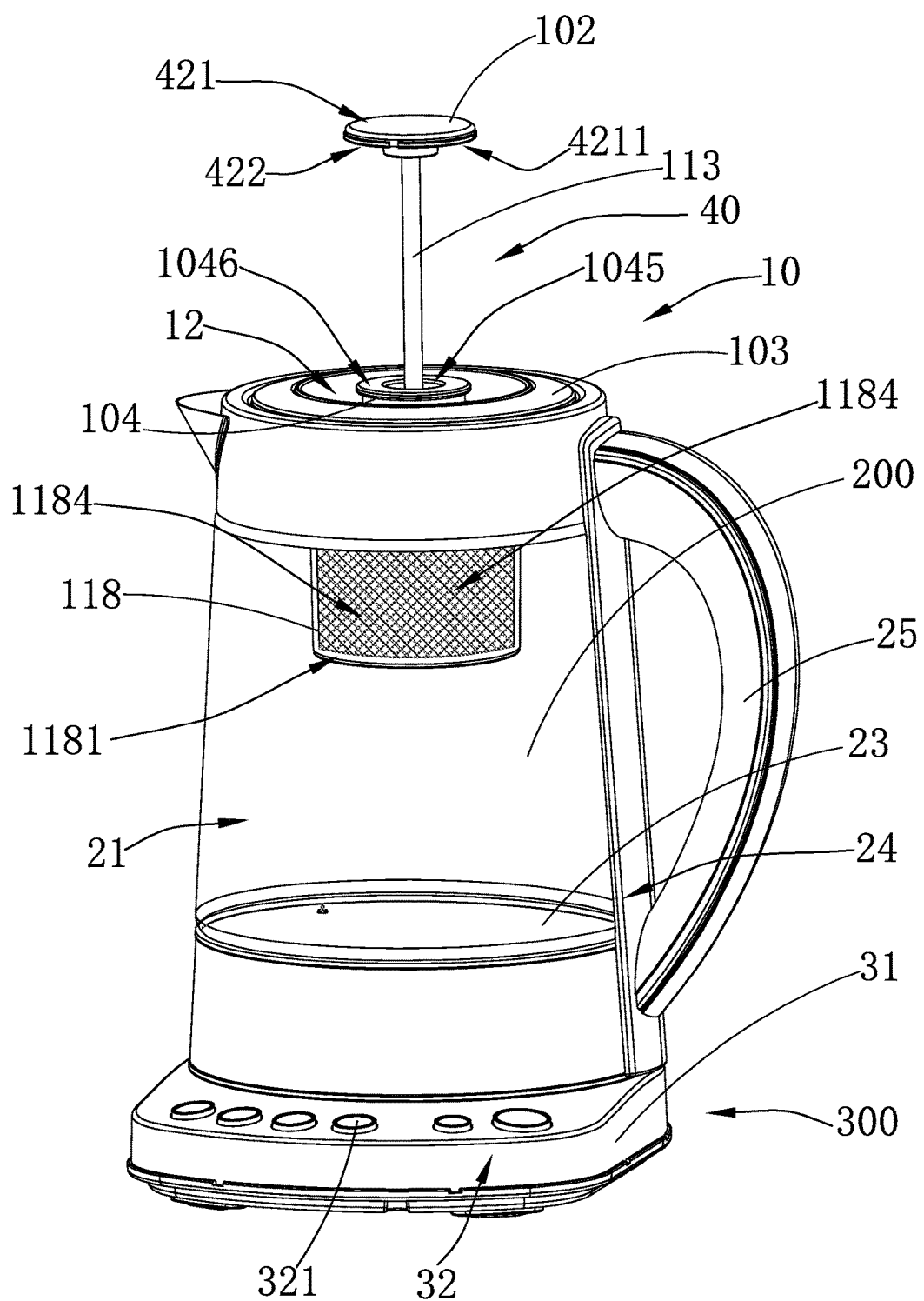
FIG. 2 is a perspective view a kettle according to the preferred embodiment of the present invention, illustrating that the filter cup is in a lift-up position.
Figure 3:
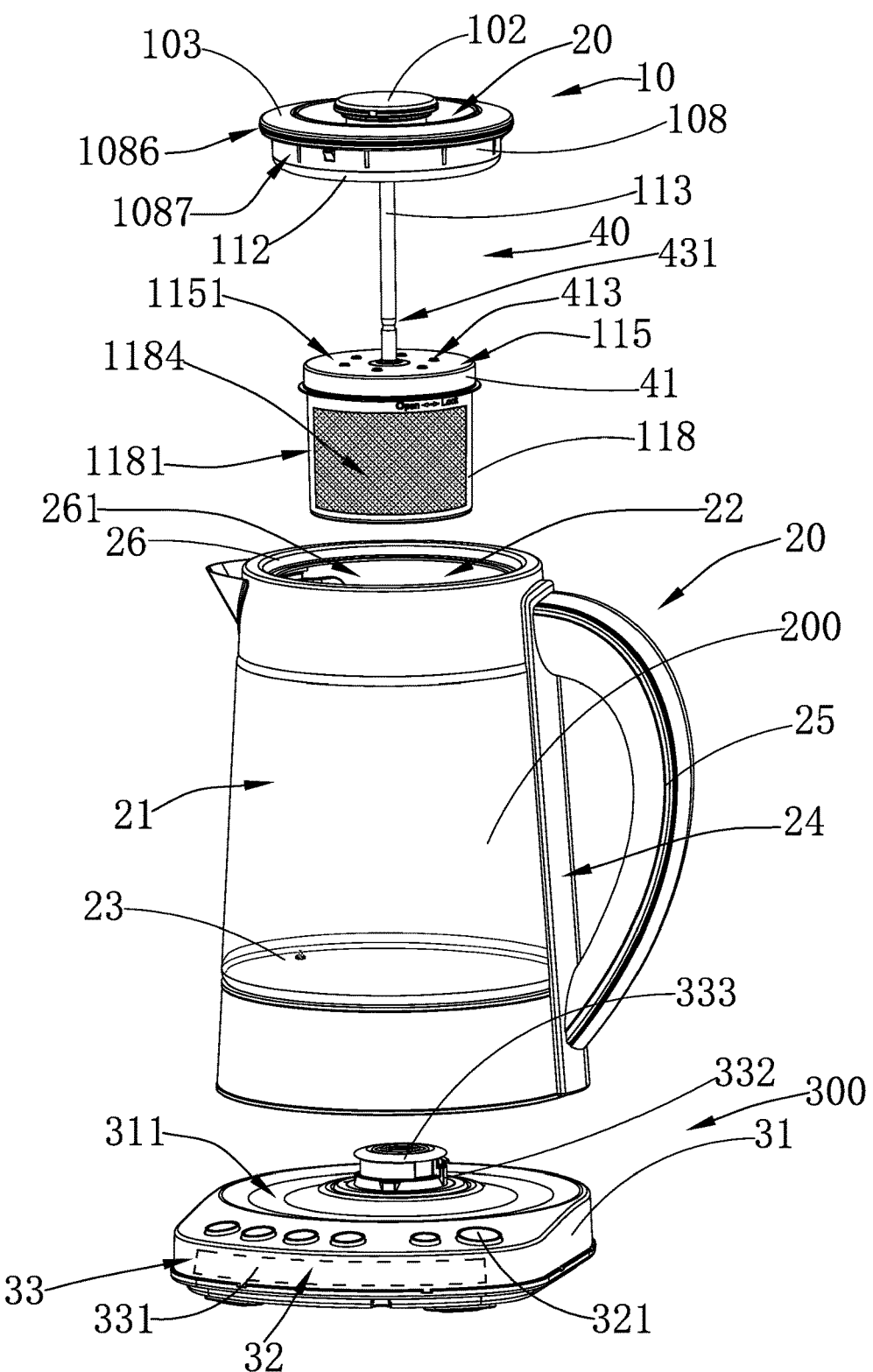
FIG. 3 is a schematic diagram of the kettle according to the preferred embodiment of the present invention.

The heat plate 23 may be positioned at the bottom of the water reservoir 200 so that when it is heated by the heating base 300, the heat plate 23 may generate heat which may then heat up the water stored in the receiving cavity 21. The heat plate 23 may be made of metallic material so that it may withstand high temperature. The water reservoir 200 may be configured to have a substantially circular cross sectional shape as shown in FIG. 1 to FIG. 3 of the drawings.

The top cap 10 may comprise a cap protective member 103, an upper covering member 108 and a lower covering member 112 downwardly extended from the upper covering member 108. Each of the upper covering member 108 and the lower covering member 112 may be configured to have a circular cross section. The upper covering member 108 may have an enlarged portion 1086 and a contracted portion 1087 downwardly extended from the enlarged portion 1086. The upper covering member 108 may be configured as having a hollow structure for receiving other elements of the present invention (described below). On the other hand, the lower covering member 112 may be configured as a circular panel-like structure for supporting other elements of the present invention and for connecting with the upper covering member 108.

Thus, a diameter of the lower covering member 112 may be substantially the same as that of the contracted portion 1087 of the upper covering member 108 which may have a slightly lesser outer diameter than that of the enlarged portion 1086. The diameter of the lower covering member 112 and the contracted portion 1087 may be substantially the same as (or slightly less than) that of the rim opening 261, while the diameter of the enlarged portion 1086 of the upper covering member 108 may be substantially the same as (or slightly less than) an inner peripheral diameter of the top rim member 26 for covering the water reservoir 200. The cap protective member 103 may be overlappedly covered on top of the enlarged portion 1086 for reinforcing the upper covering member 108.

The top cap 10 may further have a central recess 12 formed on the upper covering member 108, and further comprise a securing member 104 provided in the central recess 12 of the upper covering member 108. As shown in FIG. 1 to FIG. 5 of the drawings, the securing member 104 may be arranged to bias against the stopper 102 for restricting a downward movement thereof.

The securing member 104 may have a circular cross section and may be accommodated in the central recess 12 of the top cap 10. The securing member 104 may comprise a main securing body 1041 having a central indention 1045 and a top biasing surface 1046 for biasing against the stopper 102. The securing member 104 may further have a first central through hole 1042 formed thereon, wherein the lifting member 113 may slidably penetrate through the securing member 104 through the first central through hole 1042. The securing member 104 may be configured as having a tubular structure so that other elements of the present invention may be received in the securing member 104 (described below). Moreover, the upper covering member 108 may further have a second central through hole 1081, and the lower covering member 112 may have a third central through hole 1121. The first through third central through hole 1042, 1081, 1121 may be aligned with each other so that the lifting member 113 may penetrate the top cap 10 by penetrating the first through third central through hole 1042, 1081, 1121.

The filter cup 118 may be configured from metallic material and may have a circular cross sectional shape. In the preferred embodiment of the present invention, the meshes 1184 may be formed on both the side boundary wall 1181 and the bottom wall 1182. A predetermined amount of tea leaves or other food items may be disposed in the storage cavity 1183. Water stored in the receiving cavity 21 may enter the storage cavity 1183 through the meshes 1184. Thus, the tea leaves or the other food items may chemically communicate with the water in the receiving cavity 21 through the meshes 1184.

The filter cup 118 may further comprise a plurality of locking members 1185 inwardly protruded from an upper peripheral rim portion of the side boundary wall 1181 for detachably locking with the supporting member 41 of the filter cup lifting arrangement 40. The locking members 1185 may be arranged to engage with the supporting member 41 for selectively and rotatably locking therewith.

The supporting member 41 may have an upper reinforcing portion 115 and a lower engagement portion 116 downwardly extended from the upper reinforcing portion 115. The upper reinforcing portion 115 may have a substantially circular cross sectional shape while the lower engagement portion 116 may be configured as having an annular or ring-shaped structure. A diameter of the upper reinforcing portion 115 is larger than that of the lower engagement portion 116. The supporting member 41 may further have a plurality of engagement threads 411 inclinedly formed on an outer peripheral surface of the lower engagement portion 116 for rotatably engaging with the locking members 1185 of the filter cup 118. Thus, the filter cup 118 may detachably and rotatably engage with the supporting member 41 through engagement between the locking members 1185 and the engagement threads 411.

The upper reinforcing portion 115 of the supporting member 41 may be configured from or protected by metallic material and may have a top reinforcing surface 1151 which may be made from metallic material. Due to the annular shape of the lower engagement portion 116, the supporting member 41 may further have a venting cavity formed between a space surrounded by a bottom surface of the upper reinforcing portion 115 and an inner circumferential surface of the lower engagement portion 116.

In addition, the supporting member 41 may have a plurality of through venting holes 413 formed on the upper reinforcing portion 115. The venting holes 413 may communicate the storage cavity 1183 of the filter cup 118 with an exterior thereof (such as with the receiving cavity 21).

A user may be able to rotate the filter cup 118 in a predetermined direction (such as a clockwise direction) for rotatably engaging with the lower engagement portion 116 of the supporting member 41. When the user wishes to detach the filter cup 118 from the supporting member 41, he may simply need to rotate the filter cup 118 in a reversed direction (such as an anti-clockwise direction) for rotatably unlocking the filter cup 118 from the lower engagement portion 116 of the supporting member 41.

The stopper 102 and the supporting member 41 may be provided at two end portions of the lifting member 113 respectively, so that when the lifting member 113 vertically moves with respect to the water reservoir 200, the supporting member 41 and the filter cup 118 may also move vertically in the receiving cavity 21. As shown in FIG. 1 and FIG. 2 of the drawings, the length of the lifting member 113 may dictate the extent to which the filter cup 118 may move in the receiving cavity 21.

The stopper 102 may have a stopping portion 421 and a contracted portion 422 downwardly extended from the stopping portion 421. Each of the stopping portion 421 and the contracted portion 422 may have a generally circular cross section in which a diameter of the stopping portion 421 is larger than that of the contracted portion 422. The contracted portion 422 is shaped and sized to retrievably accommodate in the central indention 1045 of the securing member 104. A bottom stopper surface 4211 of the stopping portion 421 may be arranged to bias against the top biasing surface 1046 of the securing member 104.

Figure 4:
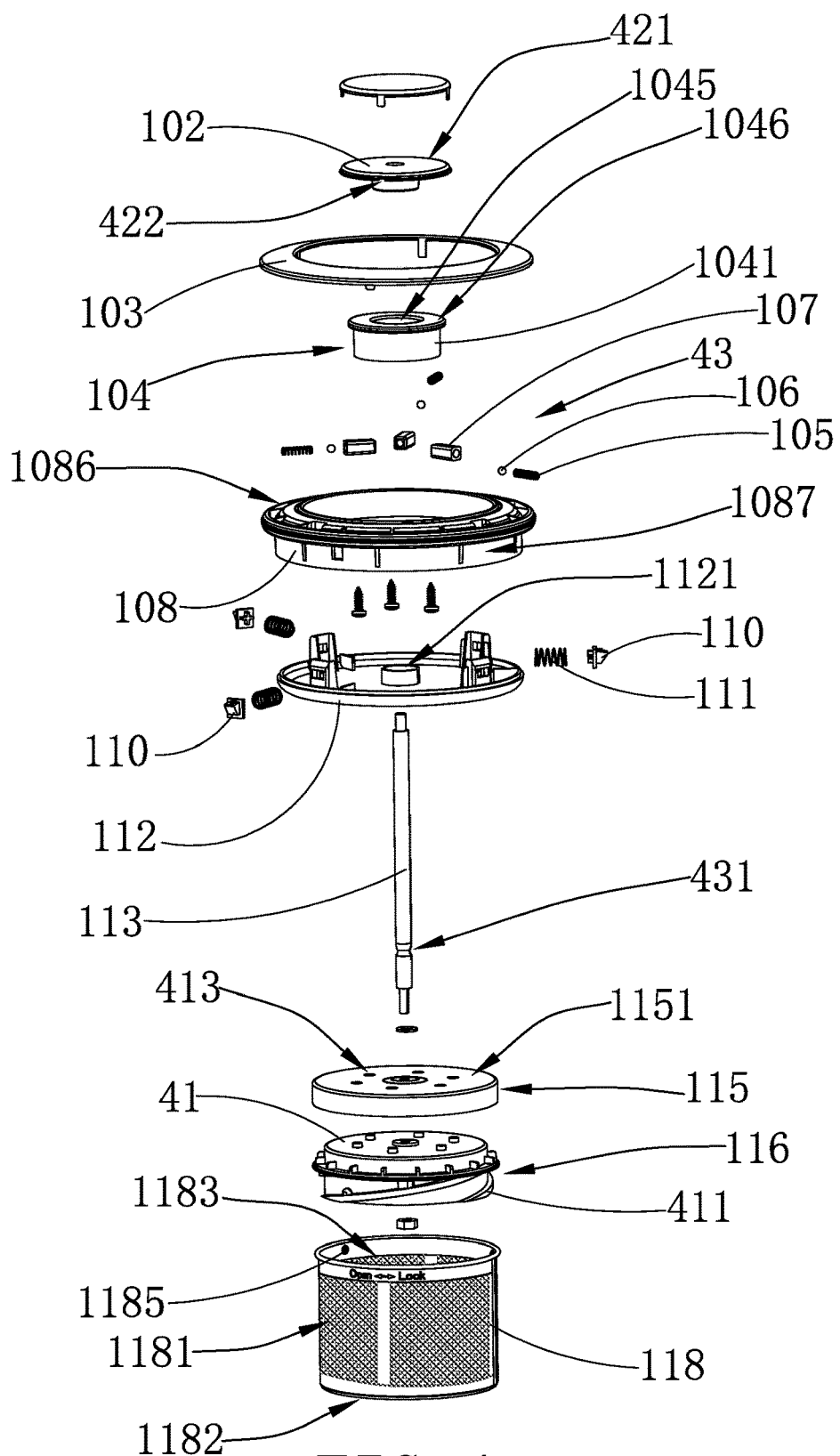
FIG. 4 is an exploded perspective view of the kettle according to the preferred embodiment of the present invention.
Figure 5:
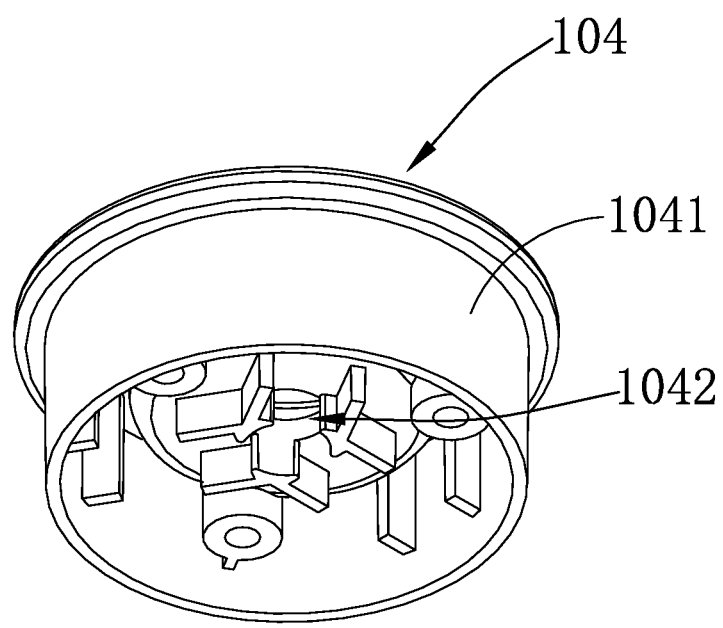
FIG. 5 is a bottom perspective view of a securing member according to the preferred embodiment of the present invention.
Figure 6:
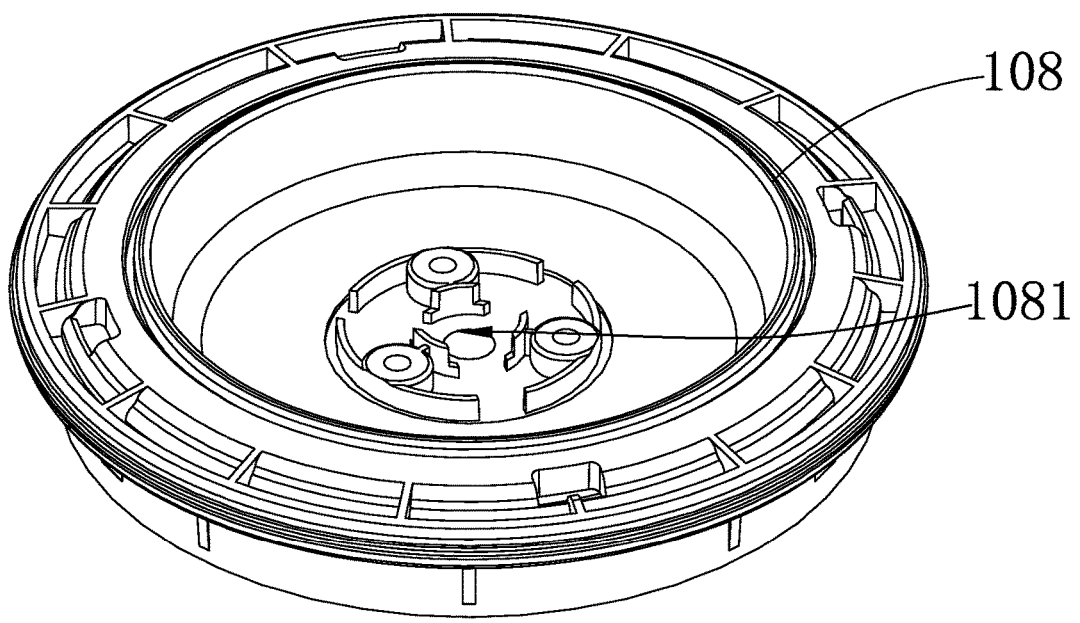
FIG. 6 is a perspective view of the upper covering member of the top cap according to the preferred embodiment of the present invention.
Figure 7:
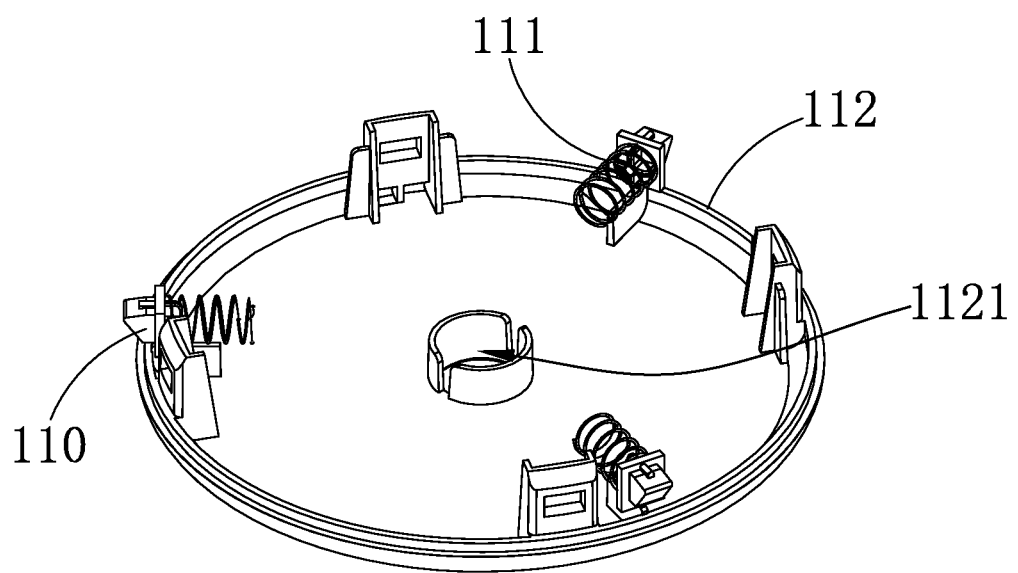
FIG. 7 is a perspective view of a lower covering member of the top cap according to the preferred embodiment of the present invention.
Figure 8:
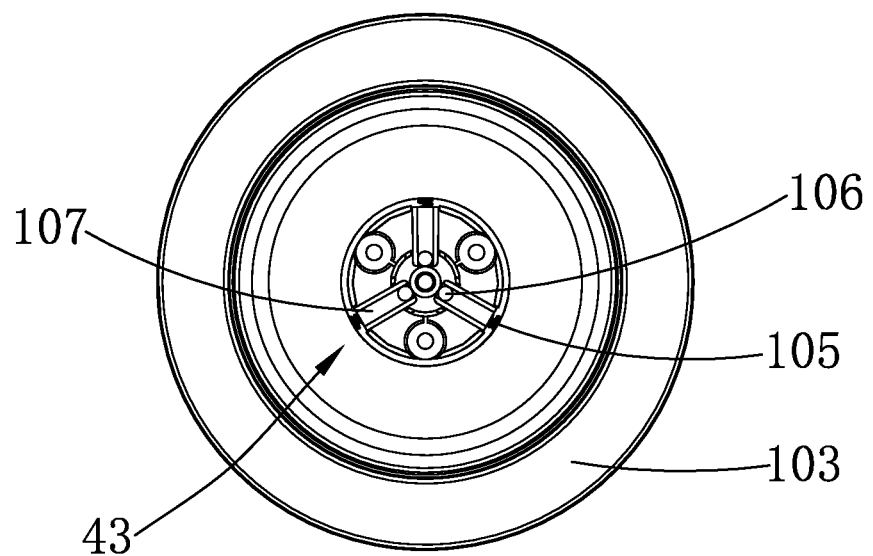
FIG. 8 is a schematic diagram of the top cap according to the preferred embodiment of the present invention.

Referring to FIG. 6 to FIG. 8 of the drawings, the filter cup lifting arrangement 40 may further comprise a sliding arrangement 43 provided on the supporting member top cap 10 and the lifting member 113 for facilitating smooth sliding movement thereof with respect to the lifting member 113. Specifically, the sliding arrangement 43 may comprise a plurality of (but at least one) rotating members 106, a plurality of resilient elements 105, and a plurality of guiders 107 provided in the securing member 104 which may be connected to the upper covering member 108 of the top cap 10. The sliding arrangement 43 may further contain an indention 431 formed on a lower portion of the lifting member 113 for operatively engaging with the rotating members 106. In this preferred embodiment as shown in FIG. 4 and FIG. 8 of the drawings, there may be three guiders 107 and three rotating members 106 supported by the upper covering member 108 and protected by the securing member 104. The guiders 107 may be configured as having an elongated structure and may radially extend from the second central through hole 1081, wherein the rotating members 106 may be provided on inner end portions of the guiders 107 respectively. Accordingly, there are three resilient elements 105 mounted on the upper covering member 108 for normally biasing against the corresponding guiders 107 which may exert a biasing force against the rotating members 106. Each of the rotating members 106 may be configured as a metallic sphere.

As shown in FIG. 4 and FIG. 8 of the drawings, the rotating members 106 may be driven by the resilient elements 105 and the guiders 107 to normally bias against the lifting member 113. Since each of the rotating members 106 is spherical in shape and may be driven to rotate when the lifting member 113 is being moved upwardly or downwardly, the rotating members 106 may facilitate smooth and easy movement of the lifting member 113. Thus, the lifting member 113 may be upwardly lifted until the rotating members 106 engage with the indention 431. The engagement may restrict further upward movement of the lifting member 113. At this point, a user may apply a slight amount of force to move the lifting member 113 downwardly with respect to the water reservoir 200 for unlocking the engagement between the rotating members 106 and the indention 431. The indention 431 may be positioned such that there exists a small gap between a bottommost surface of the lower covering member 112 and an uppermost surface of the upper reinforcing portion 115 of the supporting member 41.

The lower covering member 112 may further comprise a plurality of biasing members 110 and a plurality of resilient members 111 mounted in the lower covering member 112 for normally exerting a biasing force against the biasing members 110 respectively. The biasing members 110 may then normally exert a slight biasing force against the top rim member 26 so that when the lifting member 113 is lifted up, the lifting force may not accidentally lift up the top cap 10.

Figure 9:
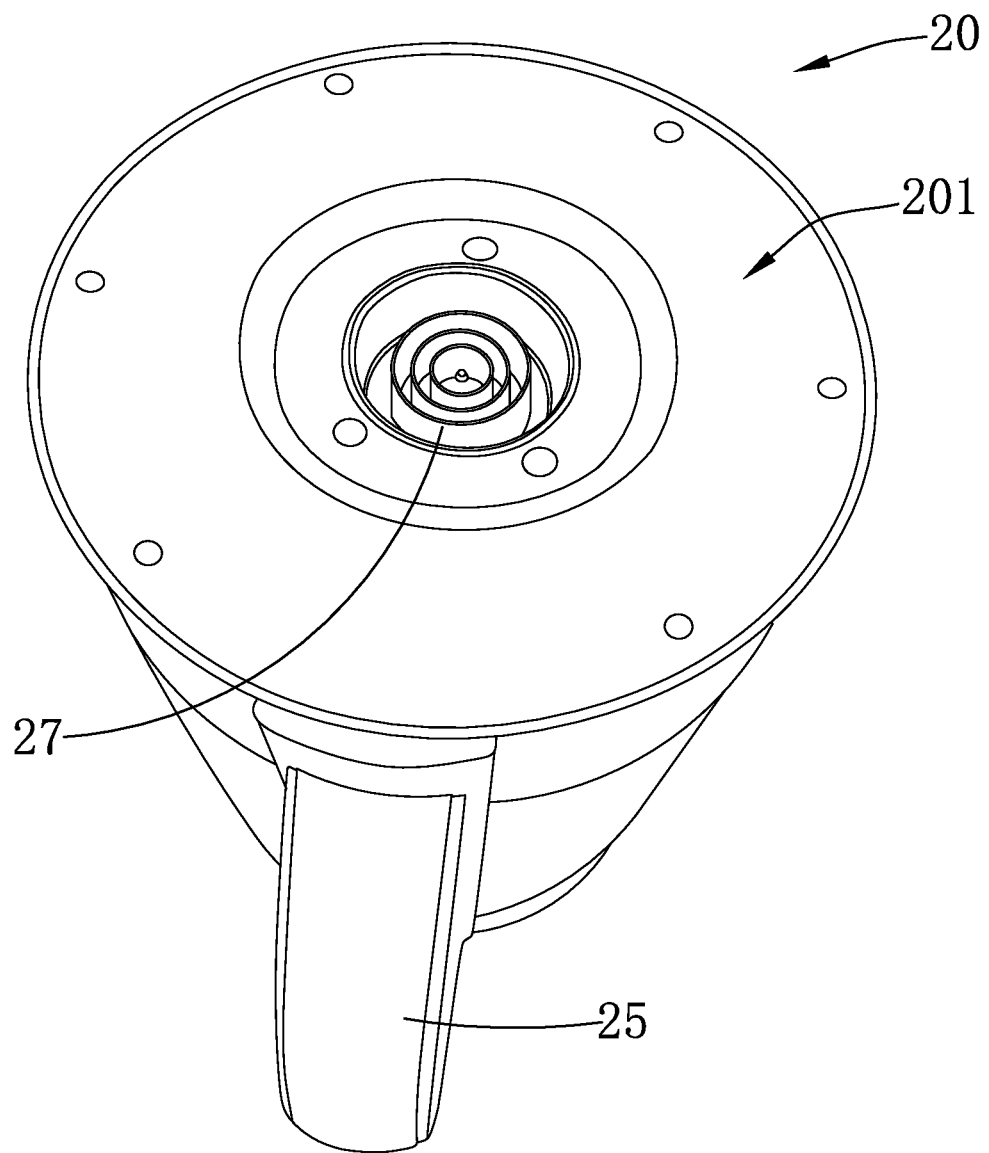
FIG. 9 is a perspective view of a heating base of the kettle according to the preferred embodiment of the present invention.
Figure 10:
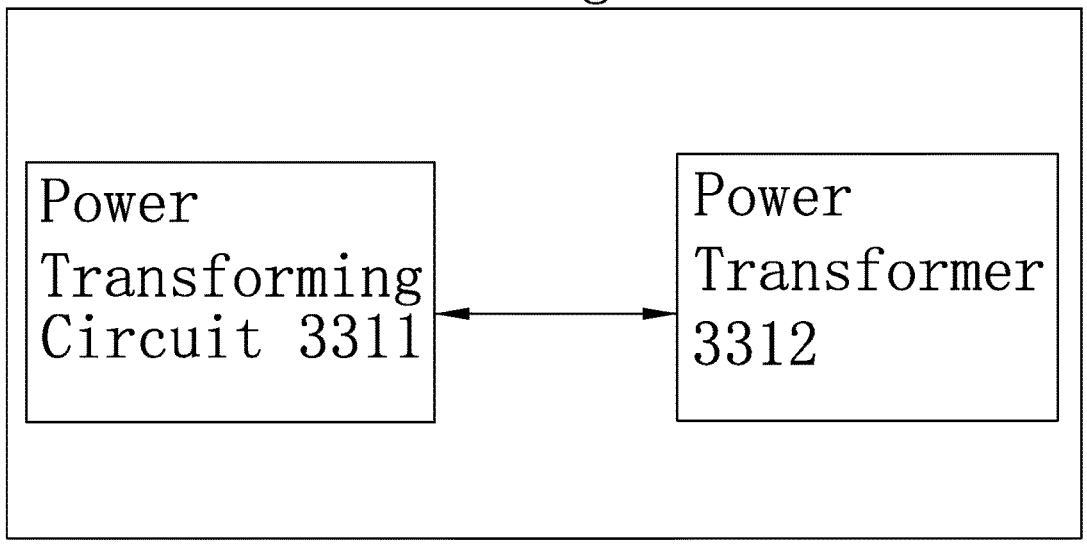
FIG. 10 is a block diagram of an electrical unit of the heating base according to the preferred embodiment of the present invention.

As shown in FIG. 1 and FIG. 9 to FIG. 10 of the drawings, the heating base 300 may comprise a base casing 31, a control panel 32 provided on the base casing 31, and an electrical unit 33 provided in the base casing 31. The base casing 31 may have a supporting platform 311 formed thereon for allowing the kettle body 20 to rest thereon. The control panel 32 may comprise a plurality of (but at least one) control buttons 321 provided on a front portion of the base casing 31. A user may be able to select operational parameters of the kettle by operating on the control buttons 321.

The electrical unit 33 may be connected to an external power source (such as an AC power source) and may comprise a power transforming unit 331 and a plurality of electrical terminals 332 provided on the supporting platform 311 for electrically connecting to the heat plate 23. The power transforming unit 331 may comprise a power transforming circuit 3311 and a power transformer 3312 which may be arranged to convert external AC power voltage to a suitable DC power as controlled by the power transforming circuit 3311. The power transforming circuit 3311 may be electrically connected to the control panel 32 so that a user is able to adjust and control the voltage supplied to the heat plate 23. The heating base 300 may further comprise a protective plug 333 protruded from the supporting platform 311, wherein the electrical terminals 332 may be provided in the protective plug 333.

Correspondingly, the kettle body 20 may further comprise a terminal socket 27 provided at a bottom surface 201 of the water reservoir 200 and electrically connected to the heat plate 23. The terminal socket 27 may be sized and shaped to correspond to the protective plug 333 so that the protective plug 333 may detachably engage with the terminal socket 27 so as to detachably engage the heating base 300 with the kettle body 20.

The operation of the present invention is as follows: a user may put a predetermined amount of food or beverage items, such as tea leaves, into the storage cavity 1183 of the filter cup 118. After that, he may pour a predetermined amount of water into the receiving cavity 21. A user may then move the lifting member 113 downwardly so as to immerse the filter cup 118 in the water (immersion position). After that, the user may engage the kettle body 20 with the heating base 300 and connect the heating base 300 to an external power supply. The user may select the type of beverage he wishes to make by operating on the control panel 32. After making the selection, the user may turn on the heating base 300 for heating up the water in the kettle body 20 for a predetermined period of time.

During the beverage making and consumption process, the user may lift up the lifting member 113 so as to stop immersing the filter cup 118 in the water or the beverage (lift-up position). This may allow the user to control the concentration of the beverage, such as the concentration of the tea. Moreover, when the user has finished consuming the beverage, he may detach the top cap 10 from the kettle body 20 and detach the filter cup 118 from the supporting member 41. The user may the replace the tea leaves in the filter cup 118 or simply trash them and wash the filter cup 118 for further use.

The present invention, while illustrated and described in terms of a preferred embodiment and several alternatives, is not limited to the particular description contained in this specification. Additional alternative or equivalent components could also be used to practice the present invention.

What is claimed is:

1. A kettle, comprising:
   a kettle body, which comprises a water reservoir having a receiving cavity and a top opening communicating said receiving cavity with an exterior of said water reservoir, and a heat plate provided on a bottom portion of the water reservoir;
   a top cap detachably attached on said water reservoir for selectively covering said top opening;
   a heating base thermally communicated with said heat plate for heating said heat plate at an elevated temperature;
   a filter cup adapted for being selectively disposed in said receiving cavity, said filter cup having a side boundary wall and a bottom wall to form a storage cavity as a space surrounded by said side boundary wall and said bottom wall, at least one of said side boundary wall and said bottom wall having a plurality of meshes for communicating said storage cavity with said receiving cavity; and
   a filter cup lifting arrangement, which comprises:
   a supporting member supported in said receiving cavity of said water reservoir, said filter cup being detachably attached on said supporting member;
   a stopper operatively provided on top of said top cap; and
   a lifting member movably extended between said supporting member and said stopper through said top cap, in such a manner that said lifting member is arranged to drive said filter cup to move between an immersion position and a lifted-up position, wherein in said immersion position, said filter cup is moved to immerse under said hot water stored in said receiving cavity, wherein in said lifted-up position, said filter cup is moved to lift up from said hot water.

2. The kettle, as recited in claim 1, wherein said filter cup further comprises a plurality of locking members inwardly protruded from an upper peripheral rim portion of said side boundary wall for detachably locking with said supporting member of said filter cup lifting arrangement, said locking members being arranged to engage with said supporting member for selectively and rotatably locking therewith.

3. The kettle, as recited in claim 2, wherein said supporting member has an upper reinforcing portion, a lower engagement portion downwardly extended from said upper reinforcing portion, and a plurality of engagement threads inclinedly formed on an outer peripheral surface of said lower engagement portion for rotatably engaging with said locking members of said filter cup.

4. The kettle, as recited in claim 3, wherein said supporting member has a plurality of through venting holes formed on said upper reinforcing portion, said venting holes communicating said storage cavity of said filter cup with an exterior thereof when said filter cup is engaged with said supporting member.

5. The kettle, as recited in claim 4, wherein said kettle body further comprises a top rim member provided on top of said water reservoir, said top rim member having a substantially annular cross sectional shape and a through rim opening in which a diameter of said top rim member corresponds to that of said top opening of said water reservoir.

6. The kettle, as recited in claim 5, wherein said top cap comprises an upper to covering member and a lower covering member downwardly extended from said upper covering member, said upper covering member has an enlarged portion and a contracted portion downwardly extended from said enlarged portion, a diameter of said lower covering member is substantially the same as that of said contracted portion of said upper covering member which has a slightly lesser outer diameter than that of said enlarged portion, said diameter of said lower covering member and said contracted portion is slightly less than that of said rim opening, while said diameter of said enlarged portion of said upper covering member is slightly less than an inner peripheral diameter of said top rim member for covering said water reservoir.

7. The kettle, as recited in claim 6, wherein said top cap further has a central recess formed on said upper covering member, and further comprises a securing member provided in said central recess of said upper covering member, said securing member is arranged to bias against said stopper for restricting a downward movement thereof.

8. The kettle, as recited in claim 7, wherein said securing member has a circular cross section and is mounted in said central recess of said top cap, said securing member comprises a main securing body having a central indention and a top biasing surface for biasing against said stopper, said securing member further having a first central through hole formed thereon, said upper covering member further having a second central through hole, said lower covering member further having a third central through hole, said first through third central through hole being aligned with each other so that said lifting member is capable of movably penetrating said top cap through penetrating said first through third central through hole.

9. The kettle, as recited in claim 8, wherein said stopper has a stopping portion and a contracted portion downwardly extended from said stopping portion, each of said stopping portion and said contracted portion has a generally circular cross section in which a diameter of said stopping portion is larger than that of said contracted portion, said contracted portion being shaped and sized to retrievably accommodate in said central indention of said securing member.

10. The kettle, as recited in claim 9, wherein said filter cup lifting arrangement further comprises a sliding arrangement provided on said supporting member top cap and said lifting member for facilitating smooth sliding movement thereof with respect to said lifting member, said sliding arrangement comprises at least one rotating member, at least one resilient element, and at least one guider provided in said securing member, said resilient element being arranged to exert a bias force to said guider and said rotating member so as to drive said rotating member to normally bias against said lifting member.

11. The kettle, as recited in claim 10, wherein said sliding arrangement further contains an indention formed on a lower portion of said lifting member for operatively engaging with said rotating members.

12. The kettle, as recited in claim 11, wherein said heating base comprises a base casing having a supporting platform, a control panel provided on said base casing, an electrical unit provided in said base casing, and a protective plug protruded from said supporting platform, said electrical unit comprising a power transforming unit and a plurality of electrical terminals provided on said supporting platform for electrically connecting to said heat plate, said electrical terminals being provided in said protective plug.

13. The kettle, as recited in claim 12, wherein said kettle body further comprises a terminal socket provided at a bottom surface of said water reservoir and electrically connected to said heat plate, said terminal socket being sized and shaped to correspond to said protective plug so that said protective plug is arranged to detachably engage with said terminal socket.

14. The kettle, as recited in claim 1, wherein said kettle body further comprises a top rim member provided on top of said water reservoir, said top rim member having a substantially annular cross sectional shape and a through rim opening in which a diameter of said top rim member corresponds to that of said top opening of said water reservoir.

15. The kettle, as recited in claim 14, wherein said top cap comprises an upper covering member and a lower covering member downwardly extended from said upper covering member, said upper covering member has an enlarged portion and a contracted portion downwardly extended from said enlarged portion, a diameter of said lower covering member is substantially the same as that of said contracted portion of said upper covering member which has a slightly lesser outer diameter than that of said enlarged portion, said diameter of said lower covering member and said contracted portion is slightly less than that of said rim opening, while said diameter of said enlarged portion of said upper covering member is slightly less than an inner peripheral diameter of said top rim member for covering said water reservoir.

16. The kettle, as recited in claim 15, wherein said top cap further has a central recess formed on said upper covering member, and further comprises a securing member provided in said central recess of said upper covering member, said securing member is arranged to bias against said stopper for restricting a downward movement thereof.

17. The kettle, as recited in claim 16, wherein said securing member has a circular cross section and is mounted in said central recess of said top cap, said securing member comprises a main securing body having a central indention and a top biasing surface for biasing against said stopper, said securing member further having a first central through hole formed thereon, said upper covering member further having a second central through hole, said lower covering member further having a third central through hole, said first through third central through hole being aligned with each other so that said lifting member is capable of movably penetrating said top cap through penetrating said first through third central through hole.

18. The kettle, as recited in claim 17, wherein said stopper has a stopping portion and a contracted portion downwardly extended from said stopping portion, each of said stopping portion and said contracted portion has a generally circular cross section in which a diameter of said stopping portion is larger than that of said contracted portion, said contracted portion being shaped and sized to retrievably accommodate in said central indention of said securing member.

19. The kettle, as recited in claim 18, wherein said filter cup lifting arrangement further comprises a sliding arrangement provided on said supporting member top cap and said lifting member for facilitating smooth sliding movement thereof with respect to said lifting member, said sliding arrangement comprises at least one rotating member, at least one resilient element, and at least one guider provided in said securing member, said resilient element being arranged to exert a bias force to said guider and said rotating member so as to drive said rotating member to normally bias against said lifting member.

20. The kettle, as recited in claim 19, wherein said sliding arrangement further contains an indention formed on a lower portion of said lifting member for operatively engaging with said rotating members.

\* \* \* \* \*